April 24, 1934.   A. A. WEIDMAN   1,956,520
VALVE ACTION FOR FLUID MOTORS
Filed June 3, 1932
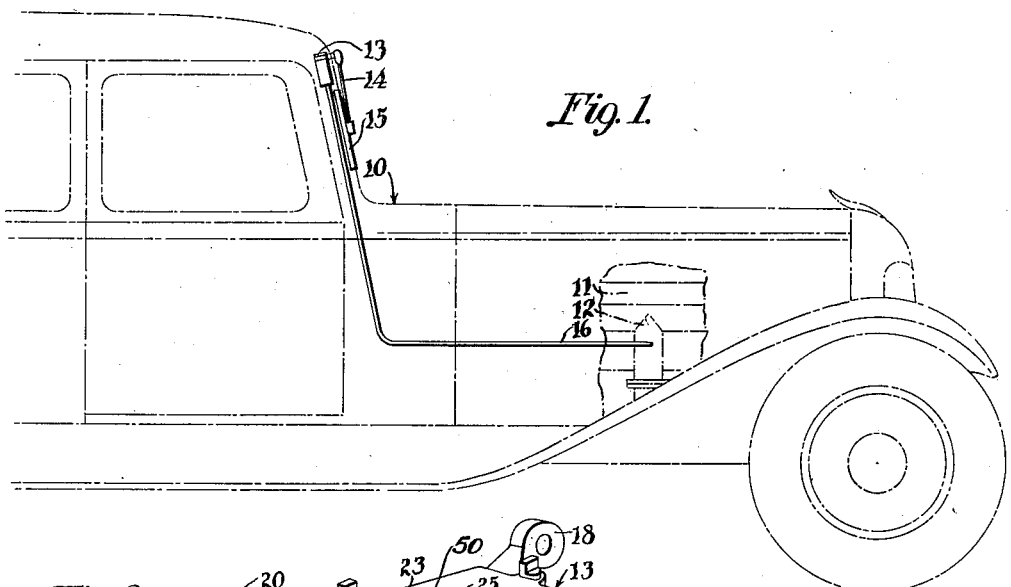
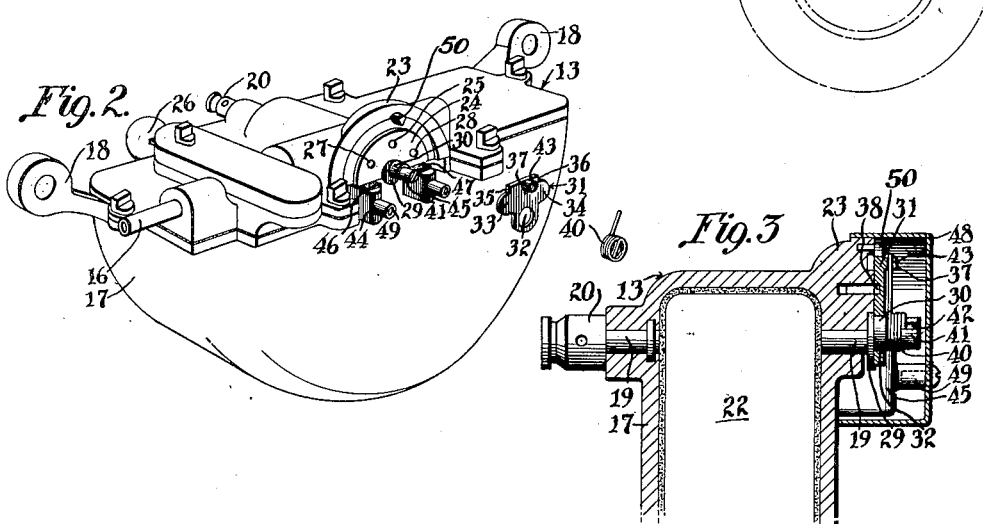
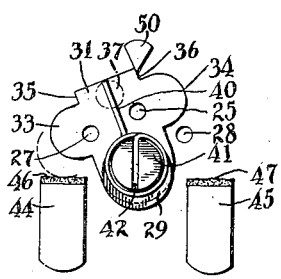
Fig.4.
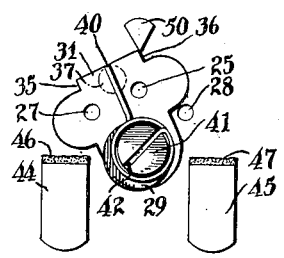
Fig.5.
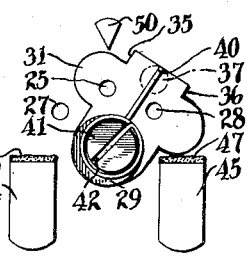
Fig.6.
INVENTOR
BY August A. Weidman,
Beau & Brooks.   ATTORNEYS Patented Apr. 24, 1934

1,956,520

UNITED STATES PATENT OFFICE 1,956,520

VALVE ACTION FOR FLUID MOTORS

August A. Weidman, Buffalo, N. Y., assignor to Trico Products Corporation, Buffalo, N. Y.

Application June 3, 1932, Serial No. 615,234

10 Claims. (Cl. 121—97)

This invention relates to a valve mechanism and action and more particularly to a valve action for use in conjunction with a differential pressure motor of the type currently in use for actuating windshield wipers.

The present invention comprehends a differential pressure motor having a valving mechanism for operatively applying the fluid pressure to the moving element thereof, which mechanism is composed of few parts, is exceedingly simple in its construction, and is practical and efficient in its operation. This and other objects of the invention will appear in the following specification and will be pointed out with more particularity in the claims.

In the drawing:

Fig. 1 shows, in broken lines, an automotive vehicle to which a differential pressure motor is attached for actuating a windshield wiper and which is operable by the sub-atmospheric pressure or suction existing in the intake manifold in the engine.

Fig. 2 is a disassembled view in perspective of the present invention.

Fig. 3 is a partial vertical section.

Figs. 4, 5 and 6 are diagrammatic views showing different stages of the operation of the valve mechanism of my invention.

Referring more particularly to the drawing, an automotive vehicle is shown in phantom at 10 provided with an internal combustion engine 11 and an intake manifold 12 for conducting mixtures of gasoline carbureted air to the cylinders of the engine, and in which, due to the movement of the pistons within the engine cylinders, there exists a gaseous pressure less than atmospheric pressure, that is, a sub-atmospheric pressure or suction. A windshield wiper motor 13 is attached adjacent a convenient portion of the windshield of the vehicle and has attached thereto a windshield wiper arm 14 and blade 15. The windshield wiper motor is rendered operable by providing fluid communication between the intake manifold 12 of the engine and motor 13 through conduit 16.

The differential pressure motor 13 is provided with a casing 17 of conventional type with the apertured lugs 18 formed thereon whereby motor 13 is readily attached to a supporting member. The motor as shown in the drawing is of the usual vane type and is therefore constructed with an oscillatable shaft 19 provided with the end 20 for carrying a windshield wiper arm 14. A piston blade 22 is attached to shaft 19 and is movable within casing 17 under the influence of differential pressure as will be more clearly explained hereinafter.

An extension member 23 is formed upon the upper portion of casing 17 and is provided with a plane face 24 constituting a seat upon which a valve plate is adapted to move. A port 25 is provided in face 24 and has fluid communication with a passageway leading to conduit 16 so that when the manually operable valve 26 is in the open position fluid tends to flow into the port 25, through conduit 16 and into the intake manifold 12. Other ports 27 and 28 are provided in face 24 for communicating operatively with opposite sides respectively of the piston blade or vane 22 within the casing. Thus, port 27 communicates with the space within the casing circumscribed by the casing walls and one side of the piston, while port 28 communicates with the space circumscribed by the other side of the piston and the casing walls.

An end of shaft 19 is provided with a flanged or plate member 29 projecting through the extension member 23 and provided with a frontal portion which is substantially coplanar with face 24. The flanged or plate member 29 has a crank pin 30 attached thereto and placed thereon eccentrically of shaft 19. A valve plate 31 is formed with an aperture 32 upon the lower portion thereof for mounting upon pin 30. The seat engaging face of the valve is provided with a recess 38 of sufficient length to cover two of the face ports, either ports 25 and 27 or ports 25 and 28 depending upon the position of valve 31. The valve is also provided with two radial shoulders 35 and 36 for a purpose to be explained hereafter. An outwardly extending member 37 is formed upon the back of valve 31.

When assembled, valve 31 is placed upon the crank pin 30 and is held tightly on its seat by means of the reduced pressure or suction obtaining in slot 38 during operation and by the spring 40, the latter exerting lateral pressure, or an urge lengthwise of the shaft, to secure the desired firm seating. The crank pin is extended beyond the valve to receive a coiled spring 40 upon preferably a reduced end 41 thereof, one end of spring 40 being anchored or maintained in the slit 42 of the reduced end 41 as for instance by pinching the slitted ends together while the other end of the spring is extended radially and is slidably engaged in slit 43 of stud member 37. Thus, upon movement of vane 22, rod 19 and pin 30, valve plate 31 is urged to move by means of the spring 40 anchored in slit 43 of the lug 37. A resilient connection is thus formed between pin 30 and valve plate 31.

In order to circumscribe the movement of valve plate 31, the limit stop members 44 and 45 are positioned at the terminals of the path of movement of the valve provided with resilient or cushioning facings 46 and 47 upon which shoulders 33 and 34 of the valve plate contact during movement of the valve. The whole of the valve mechanism is rendered dust proof by enclosing it in the cap 48, shown in Fig. 3, removably attached, as for instance by means of screws cooperating with internally threaded posts 49.

The operation of the invention will be clearly determined from an inspection of Figs. 4, 5 and 6 in conjunction with the structure shown in Figs. 2 and 3. Thus, when the manually operable valve 26 of the slide type in general use with suction operated windshield motors such as the Trico vane type, is in a position to permit fluid communication between the intake manifold 12 of the operating engine 11 and the port 25, fluid is drawn from the interior of casing 17 at one side of the piston 22, through port 27 and recess 38, through suction port 25 and then through conduit 16 to the intake manifold 12. With reference to Fig. 4, air at atmospheric pressure enters the uncovered port 28 upon the opposite side of piston 22 and thus creates a differential pressure which causes the piston and its shaft 19 to move clockwise. Since the crank pin 30 of the shaft 19 is resiliently connected to the valve 31 the latter will be placed under an urge to rotate with the crank pin. This valve movement, however, is arrested by an abutment or arrester member 50, the position of the crank pin being uppermost whereby the abutment is in the path of the valve when moving about the crank pin axis. This arresting action occurs by engagement of the shoulder 36 with the abutment 50. Continued movement of the shaft 19 builds up a torsional reserve in the spring 40, and at the same time the crank pin moves in a downward arc pulling the valve 31 radially inward (Fig. 5), thereby freeing the shoulder 36 from the abutment and permitting the tensioned spring to function in shifting the valve clockwise to a position where it will uncover port 27 to the atmosphere and establish communication between the ports 25 and 28. Such clockwise movement of the valve will be arrested as the shoulder 34 contacts the limit stop 45 (Fig. 6).

This will reverse the pressure differential on the piston 22 and start the shaft rotating counter-clockwise from the position shown in Fig. 6. During the initial portion of this counter-clockwise movement the crank pin bodily moves or shifts the valve radially outward so that the abutment 50 is disposed in the path of movement of the shoulder 35. To accommodate for this action there is provided sufficient clearance between the valve, when in its extreme positions, and the abutment. As the valve is being shifted bodily outward, or radially, to bring the shoulder 35 in a plane to engage the abutment, the spring arm 40 is imparting slight pivotal movement to the valve so that by these combined movements the shoulder 35 is brought into arresting contact with the abutment. The valve is therefore held arrested by the abutment against further movement until the crank pin again starts its downward arc on the opposite side of the shaft. During this arresting interval the spring is being tensioned torsionally so that when the shoulder 35 rides off the abutment, by and during the inward radial movement of the valve as effected by the crank pin on such downward arc of travel, the valve will be snapped to its other port-closing position, as determined by the limit stop 44 (Fig. 4).

From the foregoing it will be clearly seen that the instant invention provides a valve mechanism and action which is simplified in action, quiet in operation, and positive in placing the ports 27 and 28 alternately in communication with the interior of the motor casing and with the source of suction.

What is claimed is:

1. A sliding valve for alternately permitting fluid communication between opposite sides of a piston and a source of suction, comprising an oscillatable shaft, a member mounted eccentrically upon the end of said shaft, a valve oscillatable on said member from one operative position to another operative position, and an arrester for momentarily arresting the oscillatory movement of the valve, and a spring connected to the shaft and to the valve for moving the latter when released, said eccentric member acting to move said valve away from said arrester.

2. A valve action comprising a valve seat formed with a plurality of ports therein, one of said ports adapted to communicate with a source of suction and other of said ports adapted to communicate with opposite sides of a movable piston and with the atmosphere, a movable shaft, a movable valve for cooperating with said seat formed with a passageway therein for establishing communication between said one of said ports alternately with said other ports, said valve mounted eccentrically upon said shaft, means for arresting the movement of the valve, said valve movable radially by the eccentric mounting on the shaft to disengage the valve from said arresting means, and resilient means attached to said valve and said shaft for moving the valve about its mounting from one to the other of its port-closing positions.

3. A valve action comprising a valve seat formed with a plurality of ports therein, one of said ports adapted to communicate with a source of suction and other of said ports adapted to communicate with opposite sides of a movable piston and with the atmosphere, a movable shaft having an eccentric part, a valve movable from one predetermined position to another predetermined position for cooperating with said seat and formed with a passageway therein for establishing communication between said one of said ports alternately with said other ports, said valve mounted on the eccentric part of said shaft, means for arresting said valve during its movement between said predetermined positions, said valve releasable from the arresting means by said eccentric part, and resilient means attached to said shaft and said valve for urging said valve in the direction of movement of said shaft.

4. A valve action comprising a valve seat formed with a plurality of ports therein one of said ports adapted to communicate with a source of operating fluid pressure and other of said ports adapted to communicate with opposite sides of a movable piston and with the atmosphere, a shaft, a valve for cooperation with said seat and movable by said shaft to connect said one of said ports alternately with said other ports, means for arresting the movement of the valve and holding the latter in one position to connect said one of said ports to one of said other ports, means for moving the valve from said arresting means to release the valve for movement to a second position to connect said one of said ports to the unconnected one of said other ports, and resilient means attached to the valve and to the valve moving means for producing relative movement between the valve and the valve moving means whereby said valve is moved from one of its positions to its other position, and vice versa.

5. A valve action comprising a valve face, a valve for cooperation with said valve face, means for arresting the movement of the valve, means for bodily moving the valve to release the valve, and resilient means attached to said valve member and to the valve moving means for oscillating the valve.

6. A valve action for fluid motors, comprising an oscillating shaft, a valve seat, a valve mounted on the seat, means for mounting the valve for oscillatory movement on the seat, said means being eccentrically disposed with respect to the shaft and movable thereby to bodily shift the valve inwardly and outwardly, means for arresting the valve against pivotal movement, said valve being releasable by and during the inward shifting movement of the valve by said mounting means, and resilient means for imparting pivotal movement to the valve when released from said arresting means.

7. A valve action for fluid motors, having a valve seat, an oscillatable shaft having a crank pin, a valve pivotally mounted on the crank pin for oscillatory movement on the valve seat, an abutment, said crank pin being movable to bodily shift the valve radially in one direction whereby pivotal movement of the valve will be obstructed by the abutment, said crank pin acting first to shift the valve to be arrested by the abutment and then reverse the bodily shifting movement of the valve to release the valve from the abutment, and resilient means for imparting pivotal movement to the valve about the crank pin when released from the abutment.

8. A valve action for fluid motors, having a valve seat, an oscillatable shaft having a crank pin, a valve pivotally mounted on the crank pin for oscillatory movement on the valve seat, an abutment, said crank pin being movable to bodily shift the valve radially whereby pivotal movement of the valve will be obstructed by the abutment, said crank pin acting first to shift the valve to be arrested by the abutment and then reverse the bodily shifting movement of the valve to release the valve from the abutment, and resilient means providing a driving connection between the shaft and the valve and adapted to be tensioned by and during rotary movement of the shaft for imparting pivotal movement to the valve when the latter is released from said abutment.

9. A valve action for fluid motors, having a valve seat, an oscillatable shaft, a valve slidably mounted on the seat from one to the other of two operative positions, an abutment, means movable by the shaft for bodily shifting the valve whereby sliding movement of the valve will be obstructed by the abutment, said means acting first to shift the valve to be arrested by the abutment and then reverse the bodily shifting movement of the valve to release the valve from the abutment, and resilient means providing a driving connection between a moving part of the motor and the valve and adapted to be tensioned by and during movement of said motor part for imparting sliding movement to the valve when the latter is released from said abutment.

10. A valve action for fluid motors, having a valve seat, a motor part movable back and forth, a valve slidably mounted on the seat, an abutment, means carried by the valve adapted to engage the abutment to arrest the valve against sliding movement, means operable by said motor part for shifting said first means whereby sliding movement of the valve will be obstructed by the abutment, said second means acting first to shift said first means to be arrested by the abutment and then reverse the shifting movement to release said first means from the abutment, and resilient means providing a driving connection between the motor part and the valve and adapted to be tensioned by and during movement of said motor part for imparting sliding movement to the valve when released from said abutment.

AUGUST A. WEIDMAN.